(No Model.)

R. W. NORWOOD.
NUT LOCK.

No. 464,440. Patented Dec. 1, 1891.

Attest:
F. H. Schott
Wm L. Boyden

Inventor
Richard W. Norwood
per Fred E. Tasker, Atty.

UNITED STATES PATENT OFFICE.

RICHARD W. NORWOOD, OF COURTLAND, ALABAMA, ASSIGNOR OF THREE-FOURTHS TO FRED. E. ASHFORD, HENRY D. BYNUM, AND SAM MOORE, ALL OF SAME PLACE.

NUT-LOCK.

SPECIFICATION forming part of Letters Patent No. 464,440, dated December 1, 1891.

Application filed March 28, 1891. Serial No. 386,741. (No model.)

*To all whom it may concern:*

Be it known that I, RICHARD W. NORWOOD, a citizen of the United States, residing at Courtland, in the county of Lawrence and State of Alabama, have invented certain new and useful Improvements in Nut-Locks; and I do hereby declare the following to be a full, clear, and exact description of the invention, such as will enable others skilled in the art to which it appertains to make and use the same.

This invention relates to an improvement in nut-locks, its object being to provide a simple, cheap, and efficient lock for nuts of whatever kind they may be, and wherever they may be located, the nut-lock being particularly adapted for use in connection with bolts employed with fish-bars and railway-rails, although the nut-lock may be used with nuts on bolts in any other place in all the various kinds of machinery and structures where nut-locks are needful to keep the nut from becoming loosened upon the bolt; and it therefore consists in the construction, arrangement, and combination of parts, substantially as will be hereinafter described and claimed.

Figure 1:
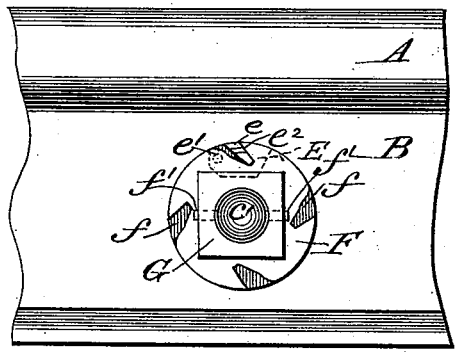
Figure 2:
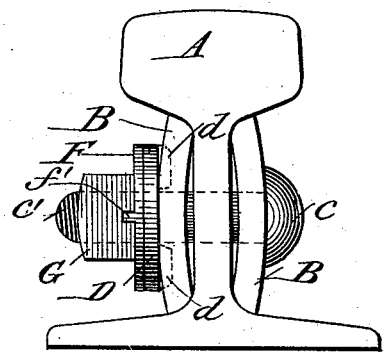
Figure 4:
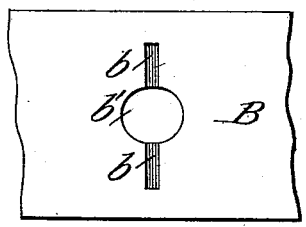
Figure 5:
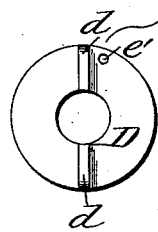
Figure 6:
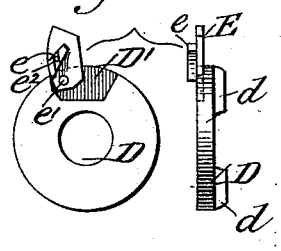
Figure 3:
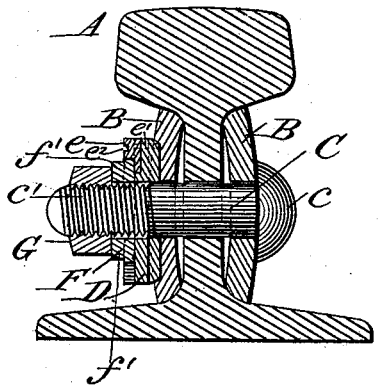
Figure 7:
Figure 8:
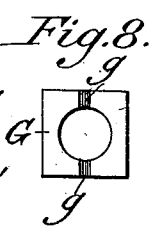

In the annexed drawings, illustrating my invention, Figure 1 is a side elevation of my improved nut-lock, represented in connection with a railway-rail, a fish-bar, and a bolt with its nut. Fig. 2 is an end elevation of the rail and fish-plates with the bolt, its nut, and the nut-lock in side elevation. Fig. 3 is a transverse section of the devices represented in Fig. 1, the bolt being shown in elevation. Fig. 4 is a detail view of a portion of a fish-plate or other piece of wood or metal which is perforated for the passage of the bolt and is provided with adjoining slots to receive lugs or flanges on one of the washers belonging to the nut-lock. Fig. 5 represents in plan view each side of the bottom washer or plate—that is to say, the washer which is located adjoining the fish-bar. Fig. 6 represents a plan view of the same washer, showing the movable latch thrust out of the position which it normally occupies within a recess in the face of said washer and representing also an edge view of the same. Fig. 7 is a plan and edge view of the upper or outer washer having the peripheral notches and the face flanges. Fig. 8 is a bottom or inside plan view of the nut.

Similar letters of reference designate corresponding parts throughout all the different figures of the drawings.

A represents any ordinary railway-rail, and B B the fish-plates located on opposite sides thereof, said fish-plates and rail being suitably perforated for the passage therethrough of the connecting-bolts, one of which is shown in the drawings designated by the reference-letter C, said bolt having the head $c$ and the screw-threaded portion $c'$.

I have shown a railway-rail and a pair of fish-plates simply for the purpose of illustrating clearly and fully the practical use of my improved nut-lock in connection with the nut upon a bolt which is used to connect said fish-plates and railway-rail. I do not consider, however, that I am to be restricted to this particular application and use of my improved nut-lock, because said locking means for the nut is adapted for use in connection with any kind of a nut, wherever it may be located, either in railway service or elsewhere.

The part through which passes the bolt having thereon the nut which it is desired to lock, which part is in this instance the fish-plate B, has a bolt-hole $b'$, as shown in Fig. 4. This part is provided with a couple of grooves $b\ b$ in line with each other and running for a short distance from the periphery of the bolt-hole $b'$, the length and width of said grooves $b\ b$ being greater or less, as may be preferred, and intended simply to receive within them suitable lugs or flanges on the under side or inside face of a washer, which constitutes one of the elements of my improved nut-lock. D represents this washer, which is suitably perforated to allow it to slip over the bolt in the ordinary way. It is formed on one side with a pair of lugs, ribs, or flanges $d\ d$, which are cast integral with the washer or are made separate and afterward attached, and are designed to enter the grooves or recesses $b\ b$ just described.

The washer D is represented in Fig. 5 as it appears when viewed from each side. On the face or side opposite to where the ribs $d\ d$ are located there is provided a recess $D'$ of suitable size and shape, said recess being of a suitable depth and extending inward from the periphery of the washer or disk as far as may be thought necessary, and said recess being preferably angular. This recess D' is designed to receive a plate E, which is movable or adjustable. Said plate is preferably pivoted by means of a pivot $e'$, so that it may swing out of the recess D' or into it. One edge of the plate E is curved to correspond to that portion of the periphery of the washer D which adjoins the recess D'. The movable plate E need not be pivoted unless desired. The pivoting can be dispensed with and the plate may be operated with equal facility. This plate E is of course suitably shaped and formed so as to fit neatly within the recess D', having the same contour and the same thickness. Further, plate E is provided on its face with an inclined flange, tooth, or rib $e$, which is adapted to engage indentations or notches on another washer adapted to be placed alongside the washer D. The face of the tooth or flange $e$ may be provided with a little cross-notch $e^2$ to assist in laying hold of the plate E when it is to be withdrawn out of the recess D', or, in other words, transferred from the position shown in Fig. 5 to the position shown in Fig. 6.

It will be particularly noted that I do not intend to confine myself to a circular form for the washer D; but it may be a polygon, having any number of sides, or its contour may be shaped irregularly or otherwise, if preferred. When the washer D has been placed in position upon the bolt, with its flanges $d\ d$ entering the recesses $b\ b$, it will be evident that the washer will be non-rotative.

F designates another washer, consisting of a thin metallic plate of suitable diameter and thickness, said plate being circular or of any other polygonal form and being of course centrally perforated to permit it to slip on over the bolt C. Said washer-plate F is represented in plan view and in edge view in Fig. 7. It is provided on its outer face with a couple of lugs, projections, or flanges $f'\ f'$, located on radial lines of the washer and running from the periphery of the central perforation for a short distance toward the periphery of the washer or disk, as is clearly represented in the plan view in Fig. 7. Said washer F is also provided with a series of indentations or notches $f\ f$ of convenient size and form. They are preferably inclined somewhat, the inclination being similar to the inclination of the ribs $e$ on the movable plate E. These indentations or notches $f\ f$ are designed to receive the inclined lug or tooth $e$. Thus the washer F can be rotated after it has been placed upon the bolt and locked firmly in any desired position by swinging the latch-plate E from its idle position (shown in Fig. 6) into the position where the tooth $e$ will engage one of the notches $f$ and prevent further rotation of the washer F, holding it, therefore, fixed and immovable.

G designates a nut, given here by way of example only in order to illustrate the way in which my improved locking means are used to lock it. Said nut G is provided with notches or grooves $g\ g$ on one of the faces thereof, said grooves being located on radial lines and adapted to receive within them the lugs or flanges $f'\ f'$ with which the washer F is provided. After the washer F has been placed upon the bolt with its under face close against the face of the washer D, then the grooved nut G may be screwed upon the screw-threaded end $c'$ of the bolt until its inside face comes in contact with the lugs $f'$ on the washer F. Then by properly adjusting the washer these lugs or ribs can be caused to take into the grooves $g$, thus forming an engagement between the washer F and the nut G, so that they will both rotate together. The operator can continue to rotate the nut G until he has brought the washer F tightly and immovably against the face of the washer D and the nut G has become screwed as tightly upon the bolt as is possible. Then by swinging the latch into engagement with one of the notches of the washer F any reverse motion of the said washer F is effectually prevented, and consequently any stirring or displacing or loosening of the nut G is effectually obviated and avoided. Whenever it is desired to take off the nut G, all that needs to be done is to simply disengage the latch-tooth $e$ from the notch $f$, into which it has entered, and then the nut can be readily removed from the bolt.

Having thus described my invention, what I claim as new, and desire to secure by Letters Patent, is—

In a nut-lock, the combination of a perforated plate B, having grooves $b\ b$, a washer D, having flanges $d\ d$ and on its opposite side having the recess D', a latch-plate E, having a tooth or projection $e$ and pivoted at $e'$ within the recess D', a peripherally-notched washer F, having on one face flanges or lugs $f'$, and a nut G, grooved at $g$ to receive the flanges $f'$, substantially as described.

In testimony whereof I affix my signature in presence of two witnesses.

RICHARD W. NORWOOD.

Witnesses:
 GEO. L. CLARK,
 WM. L. BOYDEN.